United States Patent
Krestel et al.

(10) Patent No.: US 10,403,868 B2
(45) Date of Patent: Sep. 3, 2019

(54) BATTERY

(75) Inventors: Richard Krestel, Leonberg (DE); Dietmar Luz, Calw (DE); Miroslaw Oslislok, Leonberg (DE); Bjoern Pehnert, Berlin (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 677 days.

(21) Appl. No.: 13/332,792

(22) Filed: Dec. 21, 2011

(65) Prior Publication Data

US 2012/0196157 A1 Aug. 2, 2012

(30) Foreign Application Priority Data

Jan. 27, 2011 (DE) .................. 10 2011 000 353

(51) Int. Cl.
| | | |
|---|---|---|
| *H01M 2/10* | (2006.01) | |
| *H01M 10/6563* | (2014.01) | |
| *H01M 10/6556* | (2014.01) | |
| *H01M 10/6568* | (2014.01) | |
| *H01M 10/613* | (2014.01) | |

(52) U.S. Cl.
CPC ....... *H01M 2/1072* (2013.01); *H01M 10/613* (2015.04); *H01M 10/6556* (2015.04); *H01M 10/6563* (2015.04); *H01M 10/6568* (2015.04); *H01M 2220/20* (2013.01)

(58) Field of Classification Search
CPC ........... H01M 10/5016; H01M 10/613; H01M 10/625; H01M 10/655; H01M 10/6551; H01M 10/6556; H01M 10/6561; H01M 10/6562; H01M 10/6563; H01M 10/6564; H01M 10/6565; H01M 10/6566; H01M 10/6567; H01M 10/6568; H01M 2/1072; H01M 2220/20
USPC .......................................... 429/62, 120, 148
See application file for complete search history.

(56) References Cited

U.S. PATENT DOCUMENTS

| | | | |
|---|---|---|---|
| 5,607,787 A * | 3/1997 | Wedlake et al. ................ 429/62 |
| 8,535,823 B2 | 9/2013 | Song et al. | |
| 2001/0007728 A1* | 7/2001 | Ogata ................. H01M 2/0245 429/120 |
| 2005/0202315 A1* | 9/2005 | Sugeno ............... H01M 2/0242 429/156 |
| 2006/0222930 A1* | 10/2006 | Aradachi ............ H01M 2/1055 429/96 |
| 2009/0233158 A1* | 9/2009 | Kimura ................ H01G 9/0003 429/62 |
| 2010/0035142 A1* | 2/2010 | Ha ....................... H01M 2/0207 429/153 |
| 2010/0119927 A1* | 5/2010 | Bauer ........................... 429/120 |

(Continued)

FOREIGN PATENT DOCUMENTS

| | | |
|---|---|---|
| CN | 101924259 | 12/2010 |
| DE | 10 2008 057 305 | 8/2009 |

(Continued)

*Primary Examiner* — Eugenia Wang
(74) *Attorney, Agent, or Firm* — Gerald E. Hespos; Michael J. Porco; Matthew T. Hespos

(57) ABSTRACT

A battery has a housing (4) with battery cells (5) that are temperature-controlled/cooled by a liquid temperature control/liquid cooling system (10) and a gas temperature control/gas cooling system (15). The gas temperature control/gas cooling system (15) has at least one closed circuit (16) in the housing (4).

14 Claims, 4 Drawing Sheets

(56) References Cited

U.S. PATENT DOCUMENTS

| | | | |
|---|---|---|---|
| 2010/0134940 A1* | 6/2010 | Nguyen et al. | 361/91.1 |
| 2010/0136406 A1 | 6/2010 | Song et al. | |
| 2010/0151307 A1* | 6/2010 | Naganuma | H01M 2/1072 |
| | | | 429/99 |
| 2010/0307723 A1 | 12/2010 | Thomas et al. | |
| 2011/0132580 A1 | 6/2011 | Herrmann et al. | |

FOREIGN PATENT DOCUMENTS

| | | |
|---|---|---|
| DE | 10 2008 034 864 | 1/2010 |
| DE | 10 2008 059 954 | 6/2010 |
| DE | 10 2008 059 955 | 6/2010 |
| DE | 10 2009 008 222 | 8/2010 |
| JP | 2009-140654 | 6/2009 |
| JP | 2009140654 | 6/2009 |
| KR | 2010-0062576 | 6/2010 |
| WO | WO 2009146876 A1 * | 12/2009 |

* cited by examiner

BATTERY

CROSS REFERENCE TO RELATED APPLICATION

This application claims priority under 35 USC 119 to German Patent Application No. 10 2011 000 353.3, filed on Jan. 27, 2011 the entire disclosure of which is incorporated herein by reference.

BACKGROUND OF THE INVENTION

1. Field of the Invention

The invention relates to a battery with a housing and battery cells in the housing that are temperature-controlled by a liquid temperature control system and a gas temperature control system. The invention also relates to a motor vehicle having a battery of this kind.

2. Description of the Related Art

Many measures are known for the temperature control/cooling of battery cells. For example, DE 10 2008 057 305 A1 discloses a device for cooling a heat source in a motor vehicle. The device has a cooling body through which a first fluid stream can flow for dissipating heat. At least one second fluid stream can selectively be allowed to flow through the cooling body to dissipate heat. DE 10 2009 008 222 A1 discloses a battery with a housing that has at least one heat exchanger. DE 10 2008 059 955 A1 discloses a cooling plate with an integrated cooling duct for a battery. DE 10 2008 059 954 A1 discloses a battery having a cooling device with a heat exchanger that has a cooling plate and at least one meandering cooling tube through which a coolant can flow. US Published Application 2010/0136406 A1 discloses a battery housing with an air inlet opening, an air outlet opening and an additional water cooling system. DE 10 2008 034 864 A1 discloses a battery with a heat conducting plate for controlling the temperature of the battery.

An object of the invention is to make a further improvement in the temperature control/cooling of battery cells, especially traction batteries for hybrid vehicles or electric vehicles.

SUMMARY OF THE INVENTION

The invention relates to a battery with a housing and battery cells in the housing. The battery cells are temperature-controlled/cooled by a liquid temperature control/liquid cooling system and a gas temperature control/gas cooling system. The gas temperature control/gas cooling system comprises at least one closed circuit in the housing. Air preferably is used for gas temperature control/gas cooling. The gas temperature control/gas cooling preferably creates a more homogeneous temperature distribution in the battery housing to improve the temperature control of the battery cells and/or other components in the battery housing. Thus, the battery life is increased. The battery preferably is a traction battery, which also is referred to as a drive battery, and is installed as an energy source in a vehicle that is driven electrically at least in part.

The circuit for gas temperature control/gas cooling preferably extends between the housing and the battery cells. The housing preferably is a closed housing and a cavity is formed within the battery, between the battery cells and the housing. A flow of gas, in particular air, is accommodated through the interspace or cavity for gas temperature control/gas cooling.

The circuit for gas temperature control/gas cooling may extend between the housing and further components of the battery. The further components can comprise power electronics of the battery, for example.

At least one fan may be arranged in the circuit for gas temperature control/gas cooling. The fan circulates or induces a flow of a gaseous medium, such as air, in the circuit for gas temperature control/gas cooling. The fan can be activated as required, preferably in accordance with the temperature within the battery. The energy for operating the fan preferably is provided by the battery itself.

At least one cooling and/or temperature control device may be arranged in the circuit for gas temperature control/gas cooling and may accommodate a flow of both gas and liquid therethrough. The gas preferably achieves an improved more homogeneous temperature control effect/cooling effect of the liquid.

The cooling and/or temperature control device may comprises liquid ducts and gas ducts. The liquid ducts and the gas ducts can have a rectangular, round or oval cross section. To improve heat transfer, the walls of the ducts can have an increased roughness. For the same purpose, the walls of the ducts can be fit with turbulence generators.

The cooling and/or temperature control device may comprise at least one plate having gas ducts and/or liquid ducts. The liquid ducts and the gas ducts extend through the plate.

The cooling and/or temperature control device may comprise at least one plate having liquid ducts and at least one plate having gas ducts. The gas ducts can be open on one side and closed by a wall of the battery housing. A plate having gas ducts may be disposed between two plates having liquid ducts.

The battery cells may be arranged against the cooling and/or temperature control device. The battery cells preferably are in contact with at least one plate having liquid ducts.

The battery cells may be arranged between two cooling and/or temperature control devices. The cooling and/or temperature control devices preferably rest flat against the battery cells to ensure good heat transfer.

The battery cells and/or the cooling and/or temperature control devices may be horizontal and substantially parallel to the surface of the ground or to a base of the battery housing.

The battery cells and/or the cooling and/or temperature control devices may be arranged vertically and at a right angle to the surface of the ground or to a base of the battery housing.

The invention also relates to a motor vehicle having the above-described battery. The motor vehicle may be a hybrid vehicle with an electric machine or an electric vehicle having a battery that functions as a traction battery.

Further advantages, features and details of the invention will emerge from the following description, in which various embodiments are described with reference to the drawings

DETAILED DESCRIPTION OF THE PREFERRED EMBODIMENTS

Figure 1:
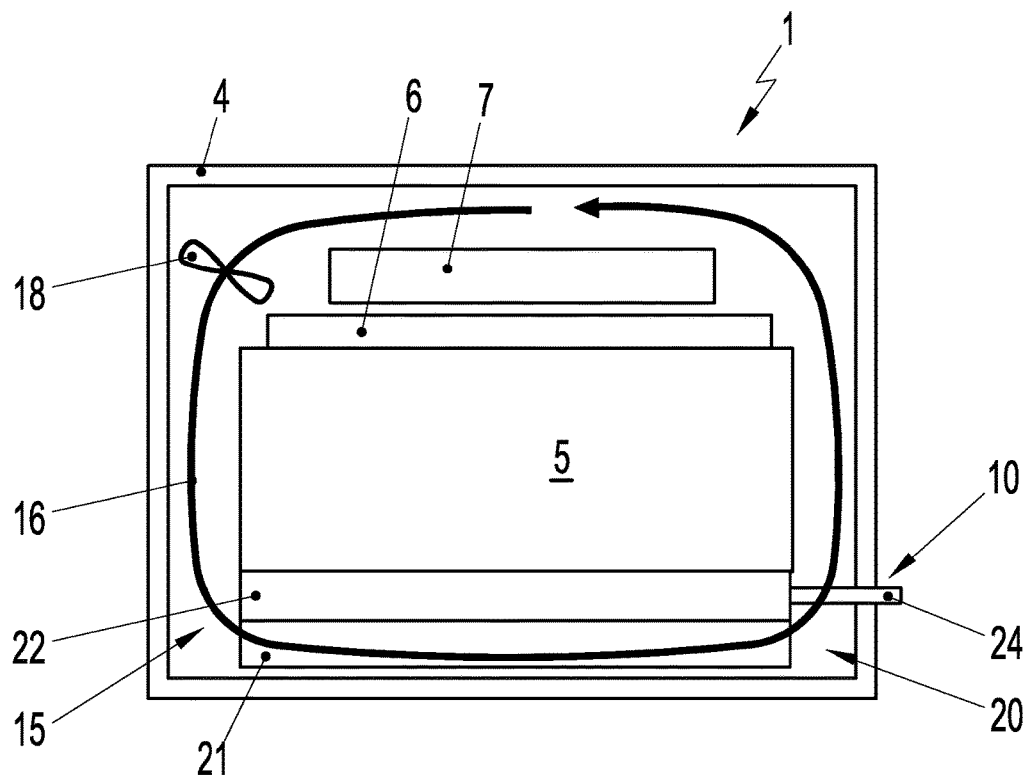
FIG. 1 is a greatly simplified illustration of a battery according to the invention in a longitudinal section through a fan.
Figure 2:
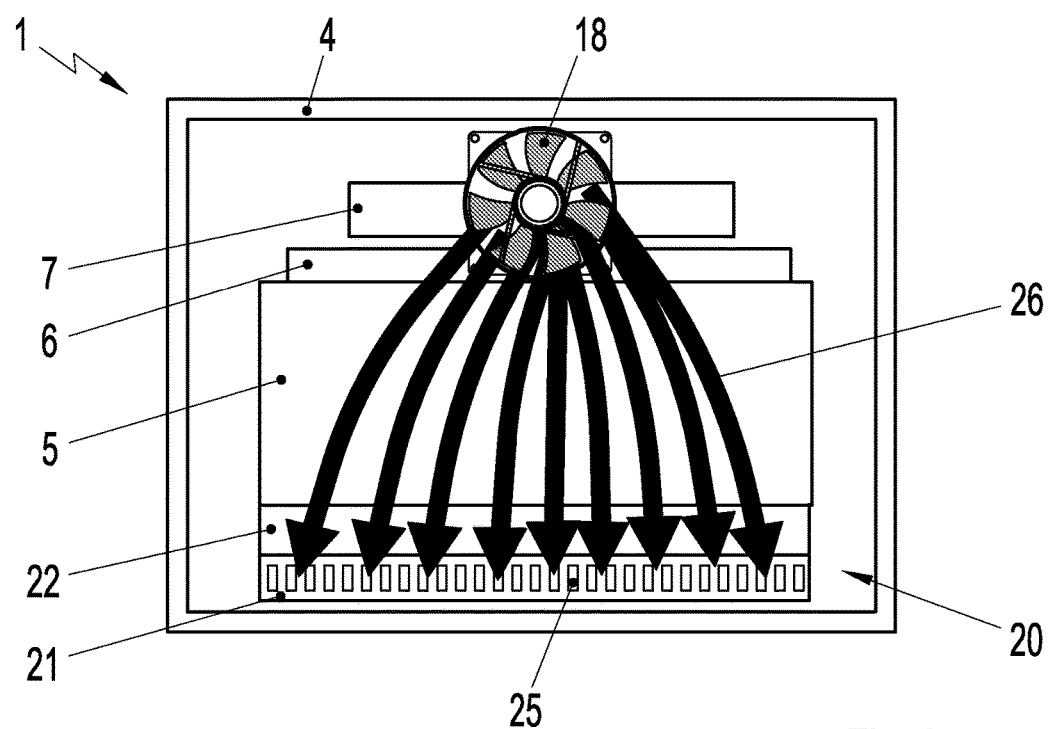
FIG. 2 is a cross section taken through the fan of the battery of FIG. 1.

A battery in accordance with a first embodiment of the invention is identified by the numeral 1 in FIGS. 1 and 2. The battery 1 has a housing 4 illustrated in greatly simplified form in two different sections. Battery cells 5 and further battery components 6, 7 are indicated in the housing 4. The battery cells 5 can be fit with additional cooling plates. The further battery components 6, 7 may comprise power electronics for monitoring and/or activating the battery cells 5.

A liquid temperature control/liquid cooling system 10 and a gas temperature control/gas cooling system 15 are combined with one another in the battery housing 4 to improve the temperature control of the battery 1. The gas temperature control/gas cooling system 15 comprises at least one closed circuit 16 in the housing 4, and hence not communicating with ambient surroundings. The temperature control systems 10 and 15 cooperate primarily for cooling the heating generating components 5, 6, 7 in the housing 4, but can perform other temperature control functions under certain conditions.

A cavity is formed in the battery 1, between the battery cells 5 or battery components 6, 7 and the housing 4, and is filled with a gas, in particular air, for the gas temperature control system 15. A fan 18 causes the gas to flow and circulate in the housing 4, as required.

FIGS. 1 and 2 illustrate a temperature control device 20 arranged under the battery cells 5 to accommodate separate flows of gas and liquid. The temperature control device 20 comprises a plate 21 with least one gas duct or air duct that forms one section of the closed circuit 16 for gas temperature control.

The temperature control device 20 has a further plate 22 between plate 21 and the battery cells 5. The plate 22 has liquid ducts, and a liquid temperature control medium, in particular a liquid coolant or refrigerant, flows through the ducts to cool or control the temperature of the battery cells 5. The liquid is fed in from outside and discharged via liquid connections 24.

The plate 21 has a multiplicity of gas ducts 25 to accommodate a flow of gas, in particular air, as indicated by arrows 26 in FIG. 2. The flow is generated by the fan 18. The gas ducts can be arranged centrally or at the side of plate 21.

The temperature control device 20 can also have further plates arranged above the battery cells 5, for example. Further fans also can be installed in the battery housing 4 for improving the air flow.

Various embodiments of temperature control devices 20 are illustrated in FIGS. 3 to 7. The cooling and/or temperature control devices can comprise one plate, two plates or more plates that can be arranged in various ways.

The liquid temperature control of the plates preferably is in contact with the battery cells 5 or the further battery components 6, 7 to enable effective temperature control (e.g. cooling).

Figure 3:
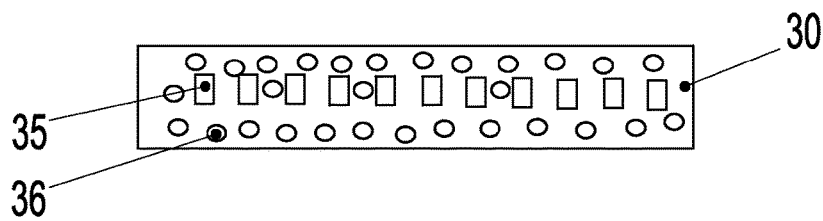
FIGS. 3-7 show various embodiments of a cooling and/or temperature control device of the battery shown in FIGS. 1 and 2.

FIG. 3 illustrates a plate 30 with both gas ducts 35 and liquid ducts 36. The gas ducts 35 have a rectangular cross section and are arranged along a center line of the plate 30. The liquid ducts 36 are arranged above and below the gas ducts 35. Some of the liquid ducts 36 are arranged between two gas ducts. The battery cells to be provided with temperature control can be arranged on the upper side or on the underside of the plate 30.

Figure 4:
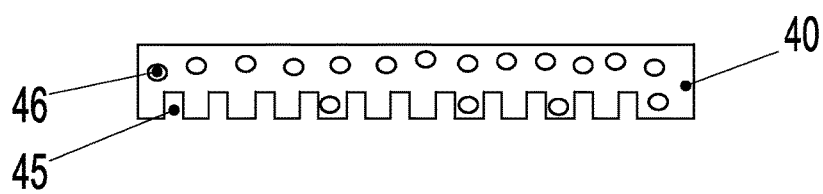

FIG. 4 illustrates a plate 40 that has gas ducts 45 and liquid ducts 46. The gas ducts 45 are open on one side. The open side of the plate 40 is the underside in FIG. 4 and can be mounted on the inside of a housing wall to close the gas ducts 45.

Figure 5:
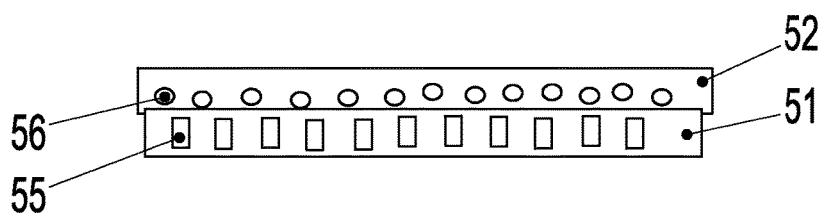

FIG. 5 illustrates a temperature control device with two plates 51 and 52. Gas ducts 55 of rectangular cross section are provided in the plate 51. Liquid ducts 56 are provided in plate 52 and have a round cross section.

Figure 6:
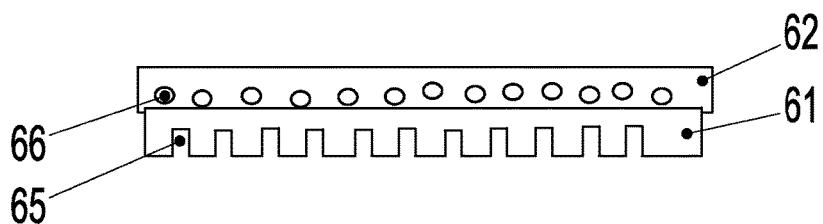

FIG. 6 illustrates a temperature control device with two plates 61, 62. The plate 62 has liquid ducts 66 with a round cross section. The plate 61 has gas ducts 65 which, like the gas ducts 45 illustrated in FIG. 4, are open on one side toward the bottom.

Figure 7:
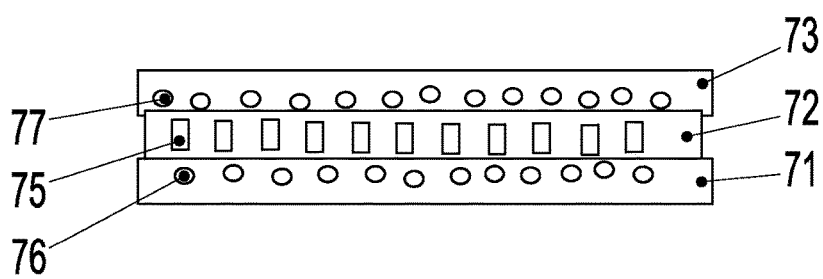

FIG. 7 illustrates a temperature control device with first, second and third plates 71, 72 and 73. The second plate 72 has gas ducts 75 with a rectangular cross section. The first and third plates 71 and 73 have liquid ducts 76, 77 with a round cross section. The second plate 72 having the gas ducts 75 is sandwiched between the first and third plates 71, 73 having the liquid ducts 76, 77.

Figure 8:
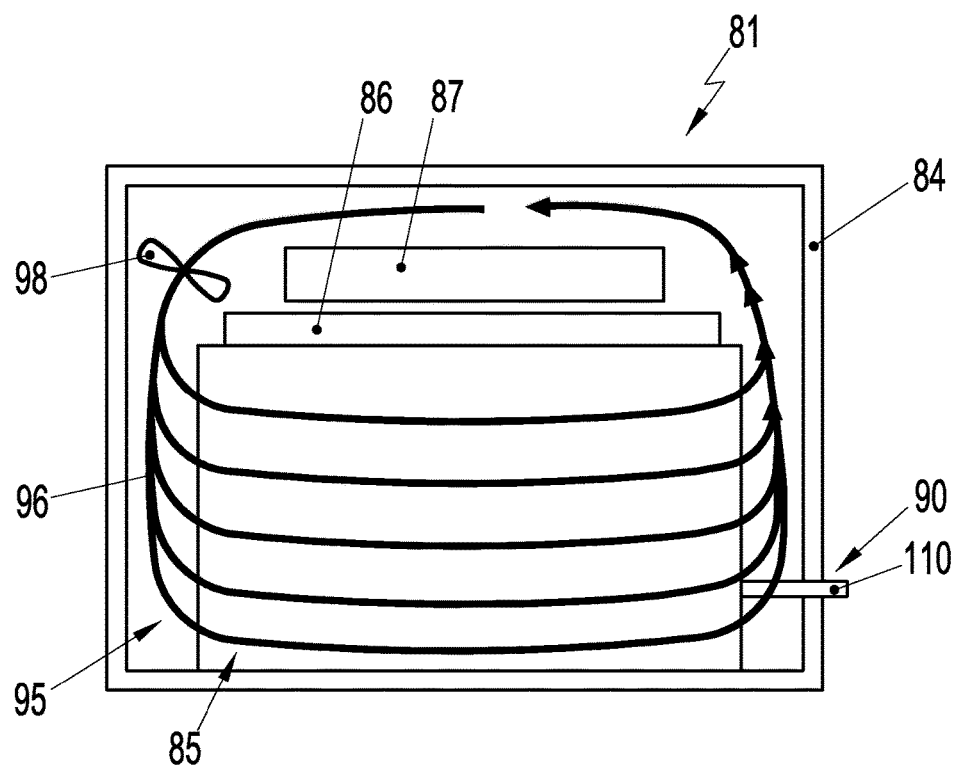
FIGS. 8 and 9 are illustrations similar to FIGS. 1 and 2, but showing another embodiment having vertically arranged battery cells.
Figure 9:
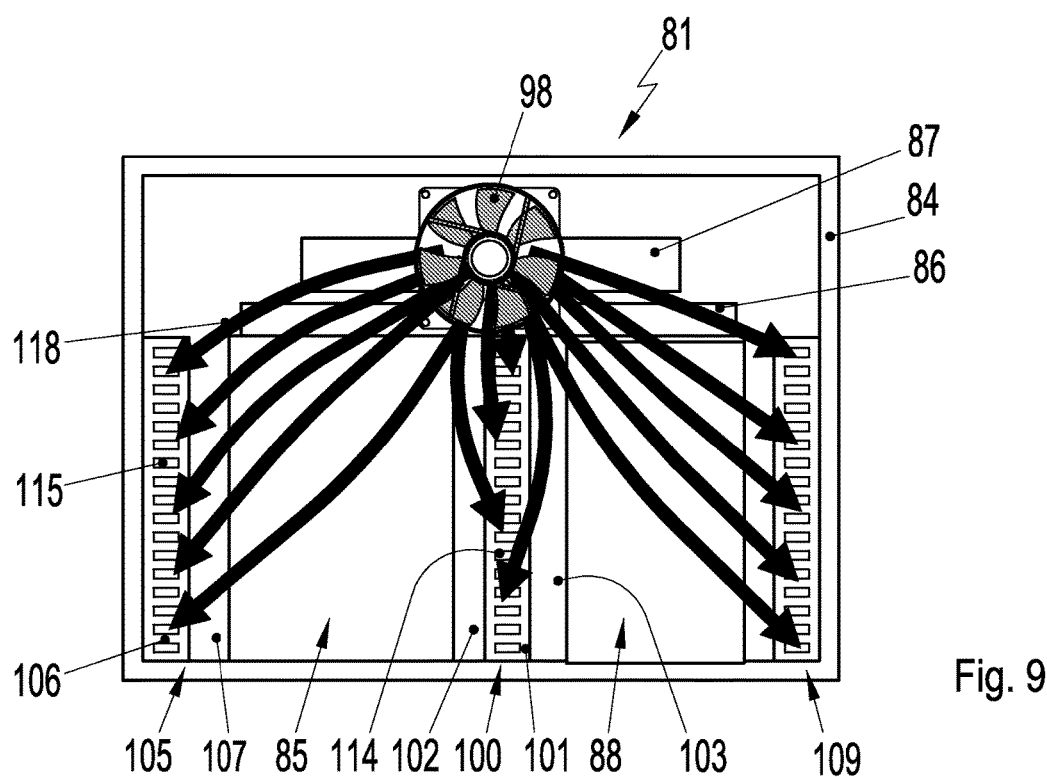

A battery in accordance with a second embodiment of the invention is identified by the numeral 81 in FIGS. 8 and 9. The battery 81 has a housing 84 illustrated in greatly simplified form in two different sections. Battery cells 85, 88 and further battery components 86, 87 are indicated in the housing 4. The battery cells 85, 88 can be fit with additional cooling plates. The further battery components 86, 87 may comprise power electronics for monitoring and/or activating the battery cells 85, 88.

A liquid temperature control system 90 and a gas temperature control system 95 are combined with one another in the battery housing 84 to improve the temperature control of the battery 81. The gas temperature control system 95 comprises at least one closed circuit 96 in the housing 84.

A cavity is formed in the battery 81, between the battery cells 85, 88 or battery components 86, 87 and the housing 84, and is filled with a gas, in particular air, for the gas temperature control system 96. A fan 98 causes the gas to flow and circulate in the housing 84, as required.

The battery 81 illustrated in FIGS. 8 and 9 has vertically arranged battery cells 85, 88 and a temperature control device 100 is arranged vertically between the battery cells 85, 88. The temperature control device 100 comprises a first plate 101 sandwiched between second and third plates 102, 103. Gas, in particular air, flows through the first plate 101. In contrast, liquid flows through the two the second and third plates 102, 103. The battery cells 85, 88 rest flat against plates 102, 103.

The temperature control device 100 can be embodied in way similar to the embodiment illustrated in FIG. 7. However, the temperature control device 100 also can be embodied as in the embodiment illustrated in FIG. 3 by combining the three plates 100 to 103 into a single plate, for example.

The battery cells 85 are arranged between the temperature control device 100 and a further cooling and/or temperature control device 105. The temperature control device 105 also is arranged vertically, but comprises just two plates 106, 107.

Gas, in particular air, flows through the plate 106 and liquid flows through the plate 107. The two plates 106, 107 can be the same as or similar to the embodiments illustrated in FIGS. 4 to 6. The plate 107 that accommodates the flow of liquid is arranged between plate 106 and the battery cells 85.

The battery cells 88 are arranged between the temperature control device 100 and a further temperature control device 109. The temperature control device 109 preferably is exactly the same as the temperature control device 105, with a plate (not designated specifically) through which liquid flows resting against the battery cells 88.

The rectangles 114; 115 in FIG. 9 are gas ducts, in particular air ducts, in the plates 101, 106. The air circulated in the housing 84 is indicated by arrows 118.

Figure 10:
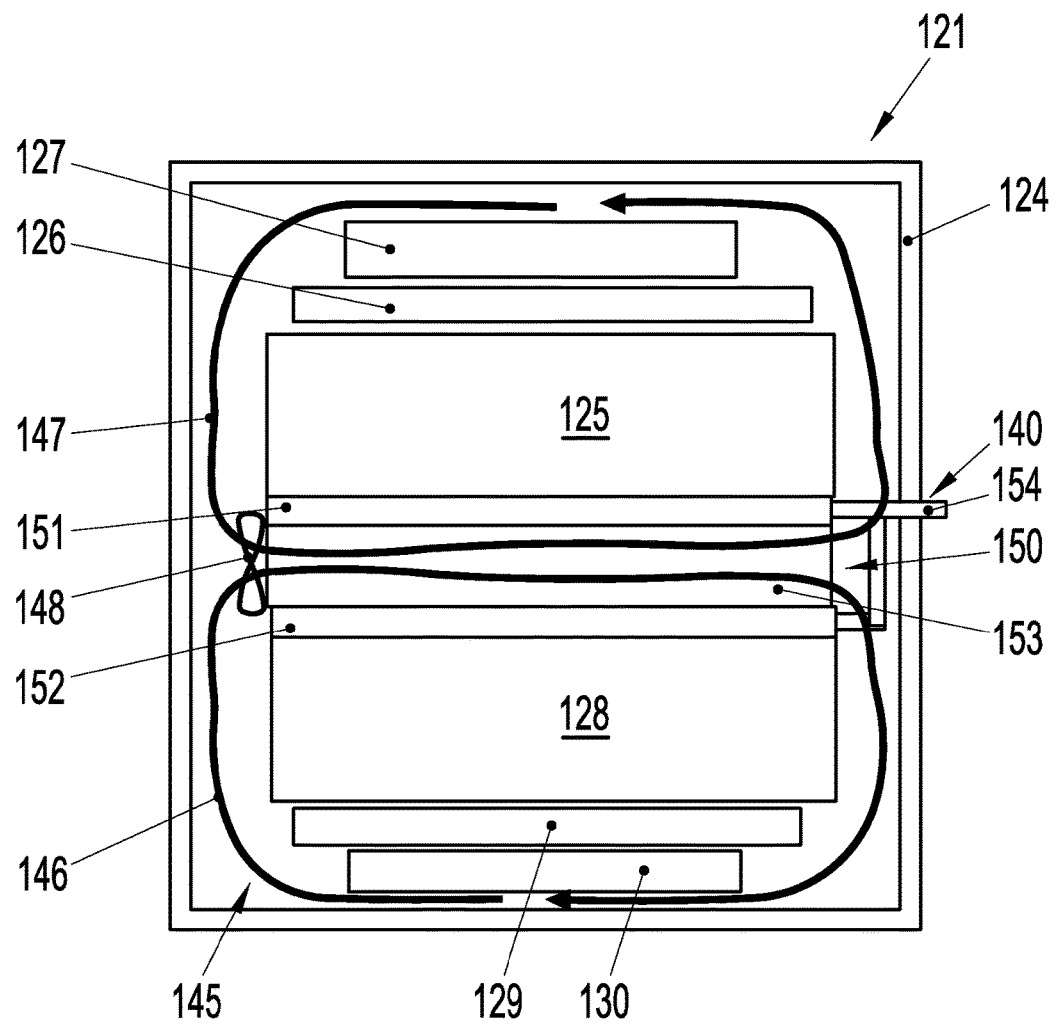
FIG. 10 is similar to FIG. 2, but shows another embodiment.

A battery in accordance with a third embodiment of the invention is identified by the numeral 121 in FIG. 10. The battery 121 has a housing 124 illustrated in greatly simplified form in two different sections. Battery cells 125, 128 and further battery components 126, 127, 129, 130 are indicated in the housing 124. The battery cells 125, 128 can be fit with additional cooling plates. The further battery components 126, 127, 129, 130 may comprise power electronics for monitoring and/or activating the battery cells 125, 128.

A liquid temperature control system 140 and a gas temperature control system 145 are combined with one another in the battery housing 124 to improve the temperature control of the battery 121. The gas temperature control system 145 comprises at least one closed circuit 146, 147 in the housing 124.

A cavity is formed in the battery 121 between the battery cells 125, 128 or battery components 126, 127, 129, 130 and the housing 124, and is filled with a gas, in particular air, for the gas temperature control system 146, 147. A fan 148 causes the gas to flow and circulate in the housing 124, as required.

The embodiment illustrated in FIG. 10 has battery cells 125, 128 arranged horizontally and parallel to a base of the housing 124 of the battery 121. A temperature control device 150 is arranged horizontally between the battery cells 125 and 128.

The temperature control device 150 comprises two plates 151, 152 through which there is a flow of liquid. A plate 153 through which gas, in particular air, flows is sandwiched between plates 151 and 152.

The underside of the battery cells 125 rests flat against the top of plate 151 and the upper side of the battery cells 128 rests flat against the bottom of plate 152. The plates 151, 152 are supplied with liquid via a liquid connection 154.

Additional battery components 126 and 127 are arranged above the battery cells 125 and additional battery components 129, 130 are arranged below the battery cells 128. The circulated air is indicated by the arrows 146 and 147.

What is claimed is:

1. A battery, comprising:
   a closed housing having a plurality of walls;
   battery cells arranged in the housing;
   a cavity formed in the closed housing between the walls and the battery cells;
   a fan in the closed housing and configured for circulating air in the cavity;
   a liquid temperature control system for controlling temperature of the battery cells, the liquid temperature control system including a first plate and liquid ducts of circular cross section formed through the first plate and comprising a substantially planar array of liquid ducts between the battery cells and a first of the walls of the housing, the liquid ducts communicating with a cooling liquid source external of the housing and being configured to circulate a flow of cooling liquid through liquid ducts; and
   a gas temperature control system for controlling temperature of the battery cells, the gas temperature control system comprising at least one closed circuit in the housing, the closed circuit including a second plate and substantially rectangular gas ducts formed by substantially rectangular channels that open on a side of the second plate that faces away from the battery cells and away from the first plate, the channels being closed by the first wall of the housing to form the gas ducts that are separate from the liquid ducts so that a row of the gas ducts are between the substantially planar array of liquid ducts and the first wall of the housing, each of the gas ducts including upstream and downstream ends within the cavity of the housing and at positions so that the fan disposed in the housing generates a flow of gaseous medium through the gas ducts and in proximity to the liquid ducts and so that the cooling liquid in the cooling ducts cools the gaseous medium in the gas ducts to produce a cooled gaseous medium, and further directs the cooled gaseous medium through the cavity between the battery cells and the walls of the closed housing, thereby enabling the gaseous medium that is caused to flow through the cavity by the fan to cool the battery cells, and wherein
   the liquid ducts include a plurality of intermediate liquid ducts disposed in the row of the gas ducts so that each of the intermediate liquid ducts is adjacent at least one of the gas ducts in the row of the gas ducts.

2. The battery of claim 1, wherein the closed circuit for the gas temperature control extends between the housing and power electronic components of the battery.

3. The battery of claim 1, wherein the battery cells are arranged against the first plate.

4. The battery of claim 1, wherein the battery cells and the first and second plates are arranged horizontally.

5. The battery of claim 1, wherein the battery cells and the first and second plates are arranged vertically.

6. A motor vehicle having the battery of claim 1.

7. The battery of claim 1, wherein the liquid ducts and the gas ducts are substantially parallel to one another.

8. The battery of claim 1, wherein the closed housing contains air as the gaseous medium.

9. A battery, comprising:
   a closed housing having a plurality of walls;
   battery cells arranged in the housing;
   a cavity formed in the closed housing between the walls and the battery cells;
   a fan in the closed housing and configured for circulating air in the cavity;
   a liquid temperature control system for controlling temperature of the battery cells, the liquid temperature control system including a plate and liquid ducts of circular cross section formed through the plate and comprising a substantially planar array of liquid ducts between the battery cells and a first of the walls of the housing, the liquid ducts communicating with a cooling liquid source external of the housing and being configured to circulate a flow of cooling liquid through liquid ducts; and
   a gas temperature control system for controlling temperature of the battery cells, the gas temperature control system comprising at least one closed circuit in the housing, the closed circuit including substantially rectangular gas ducts formed by substantially rectangular channels that open on a side of the plate that faces away from the battery cells, the channels being closed by the first wall of the housing to form the gas ducts that are separate from the liquid ducts so that the gas ducts are between the substantially planar array of liquid ducts and the first wall of the housing, each of the gas ducts including upstream and downstream ends within the cavity of the housing and at positions so that the fan disposed in the housing generates a flow of gaseous medium through the gas ducts and in proximity to the liquid ducts and so that the cooling liquid in the cooling ducts cools the gaseous medium in the gas ducts to produce a cooled gaseous medium, and further directs the cooled gaseous medium through the cavity between the battery cells and the walls of the closed housing, thereby enabling the gaseous medium that is caused to flow through the cavity by the fan to cool the battery cells.

10. The battery of claim 9, wherein the battery cells and the plate are arranged horizontally.

11. The battery of claim 9, wherein the battery cells and the plate are arranged vertically.

12. A motor vehicle having the battery of claim 9.

13. The battery of claim 9, wherein the liquid ducts and the gas ducts are substantially parallel to one another.

14. The battery of claim 9, wherein the closed housing contains air as the gaseous medium.

* * * * *